United States Patent
Le Goff et al.

(10) Patent No.: US 6,713,428 B1
(45) Date of Patent: Mar. 30, 2004

(54) DISPERSIBLE ALUMINIUM HYDRATE, METHOD FOR PREPARING SAME AND USE FOR PREPARING CATALYSTS

(75) Inventors: Pierre-Yves Le Goff, Paris (FR); Philippe Laval, Paris (FR); Michel Martin, Lyons (FR)

(73) Assignee: Instuit Francais du Petrole, Rueil Mal Maison (FR)

( * ) Notice: Subject to any disclaimer, the term of this patent is extended or adjusted under 35 U.S.C. 154(b) by 0 days.

(21) Appl. No.: 09/743,270

(22) PCT Filed: Jul. 6, 1999

(86) PCT No.: PCT/FR99/01632

§ 371 (c)(1),
(2), (4) Date: May 9, 2001

(87) PCT Pub. No.: WO00/01617

PCT Pub. Date: Jan. 13, 2000

(30) Foreign Application Priority Data

Jul. 6, 1998 (FR) .............................................. 98 08609
Apr. 16, 1999 (FR) .............................................. 99 04862

(51) Int. Cl.$^7$ .......................... B01J 23/00; C01F 7/02; C01F 7/04
(52) U.S. Cl. ...................... 502/355; 423/625; 423/628
(58) Field of Search ................................ 423/625, 628; 502/355

(56) References Cited

U.S. PATENT DOCUMENTS

| | | | |
|---|---|---|---|
| 3,864,461 A | | 2/1975 | William et al. |
| 4,055,509 A | * | 10/1977 | Weimer .................... 252/363.5 |
| 4,120,943 A | | 10/1978 | Iwaisako et al. |
| 4,332,782 A | | 6/1982 | Scherzer et al. |
| 4,371,513 A | | 2/1983 | Sanchez et al. |
| 5,178,849 A | * | 1/1993 | Bauer ......................... 423/626 |
| 5,194,243 A | * | 3/1993 | Pearson et al. ............. 423/625 |
| 6,048,470 A | * | 4/2000 | Nakahara et al. ........ 252/313.1 |

FOREIGN PATENT DOCUMENTS

| | | |
|---|---|---|
| DE | 32 43 193 | 5/1984 |
| EP | 0 324 936 | 7/1989 |
| EP | 0 505 896 | 9/1992 |
| WO | WO 95/12547 | 5/1995 |

* cited by examiner

*Primary Examiner*—Stanley S. Silverman
*Assistant Examiner*—Jonas N. Strickland
(74) *Attorney, Agent, or Firm*—Millen, White, Zelano & Branigan, P.C.

(57) ABSTRACT

The present invention concerns a novel, highly dispersible aluminium hydrate. It also concerns a process for preparing said aluminium hydrate by precipitation of an aluminium hydrate in a reactor with no back-mixing and preparation of said aluminium hydrate in a reactor with back-mixing. Finally, it concerns the use of said hydrate for the preparation of catalysts or catalyst supports.

25 Claims, 1 Drawing Sheet

Figure 1:
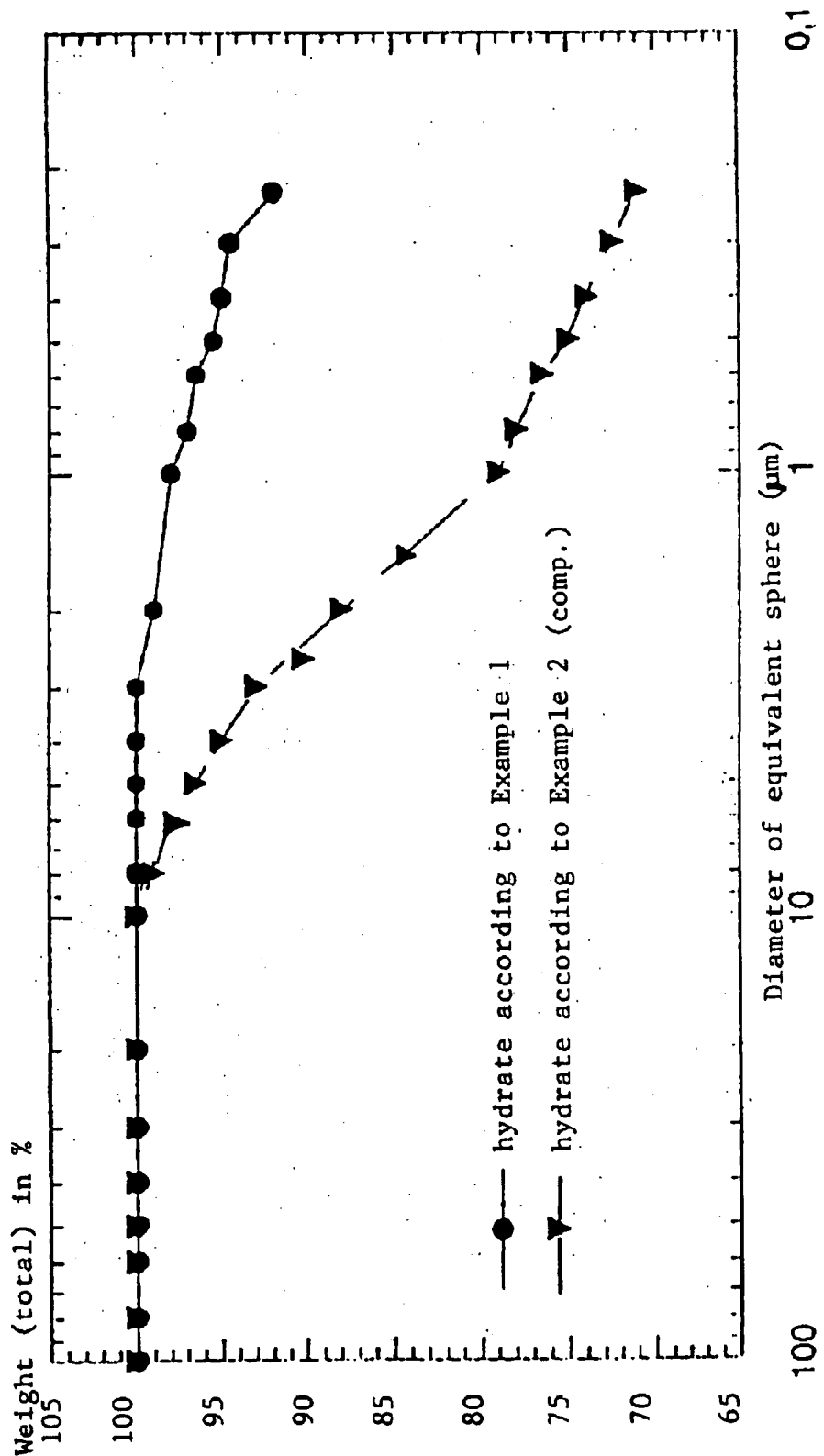

DISPERSIBLE ALUMINIUM HYDRATE, METHOD FOR PREPARING SAME AND USE FOR PREPARING CATALYSTS

The present invention relates to a novel aluminium hydrate, to a process for preparing said hydrate and to its use for the preparation of catalysts or catalyst supports.

Aluminium hydrates are used to prepare catalysts or catalyst supports. The preparation normally consists of forming the aluminium hydrate, then calcining it to transform it to alumina. The properties of the aluminium hydrate influence the characteristics of the alumina obtained and, as a result, the properties of the catalysts and catalyst supports. High dispersibility of the aluminiun hydrates in water is a desirable property as it enables catalysts or catalyst supports with advantageous properties to be prepared:

firstly, a dispersible aluminium hydrate leads to catalyst supports containing no alumina agglomerates or aggregates. Thus homogeneous supports are obtained;

then, with a dispersible aluminium hydrate, the forming conditions are milder (for example the amount of acid is lower) so a large total pore volume can be retained;

finally, catalysts or catalyst supports from a dispersible aluminium hydrate have a unimodal pore distribution with not meso and/or macropores (the terms "mesopore" and "macropore" means any pores with a size over the median diameter). In certain applications, such as hydrotreatment in oil refineries, the absence of these meso and/or macropores is desired: if the pore diameter is low (100 Å), the metals do not enter the support, preventing deactivation. Further, if the pore distribution is narrow, only certain molecules enter into the support which means that molecular sieving can be carried out. Further, the coking effects are limited and the absence of macropores increases the mechanical strength of the support.

Thus one aim of the present invention is to provide an aluminium hydrate with high dispersibility in water.

A further aim is to provide a process for preparing said aluminium hydrate.

Thus in a first aspect, the invention concerns an aluminium hydrate with a water dispersibility of at least 80% by weight for a diameter of 0.3 μm or less.

The invention also concerns processes for preparing such an aluminium hydrate. In one implementation, the aluminium hydrate is prepared without back-mixing, using the following steps:
1. mixing a source of an aluminium acid and a base or a basic source of aluminium and an acid, to precipitate an aluminium monohydrate;
2. maturing;
3. filtering;
4. washing; and
5. drying.

In a further implementation, the aluminium hydrate is prepared with back-mixing, using the following steps:
1'. mixing aluminium sulphate and a base at a pH in the range 6 to 8.5 in a stirred reactor with back-mixing, at a temperature in the range 50° C. to 95° C.;
2'. maturing at a pH in the range 9 to 11 and at a temperature in the range 60° C. to 90° C.;
3'. filtering;
4'. washing; and
5'. drying.

Finally, the invention concerns the use of this aluminium hydrate for preparing catalysts or catalyst supports.

FIG. 1 shows the grain size distributions of an aluminium hydrate of the invention and an aluminium hydrate of the prior art.

The invention thus firstly concerns an aluminium hydrate with a dispersibility of at least 80% by weight for a diameter of 0.3 μm or less.

The structure of the aluminium hydrate of the invention is mainly that of a crystalline aluminium monohydrate (AlOOH, nH$_2$O) of the boehmite and/or pseudo-boehmite type. "Mainly" means that the amount of aluminium monohydrate in the aluminium hydrate of the invention is more than 30% by weight, preferably more than 60%. The degree of crystallisation and the nature of the crystalline phase are measured by X ray diffraction. The complement to the aluminium monohydrate is generally an amorphous aluminium hydrate or a very fine aluminium hydrate which cannot be analysed by X ray diffraction.

This aluminium hydrate is characterized by its high dispersibility and is at least 80% by weight for a diameter of 0.3 μm or less, preferably at least 90% by weight for a diameter of 0.3 μm or less. The aluminium hydrate of the invention is dispersible in water at a pH other than the isoelectric point (IEP) of the aluminium hydrate.

The dispersibility of the aluminium hydrate is evaluated from its grain size analysis giving the cumulative weight as a function of the diameter of the equivalent sphere. This analysis is obtained by gravimetric sedimentation of a suspension of the hydrate to be analysed in a Sedigraph apparatus using the following protocol. The aluminium hydrate is mixed with nitric acid in an amount of 6% by weight with respect to the aluminium hydrate and with water for 30 minutes using a Brabender type mixer, the quantity of water being such that the mixture produces a paste with a loss on ignition at 1000° C. of about 58% by weight. Then the paste obtained is diluted to 100 g/l with deionised water a nd the dispersion obtained is homogenised with medium power ultrasound (2 min with a 5 mm probe, 100 watts of power).

Finally, the dispersion is analysed using a Sedigraph under the following sedimentation conditions:
density of alumina: 3.25 g/cm$^3$;
carrier liquid: water;
liquid density: 0.9957 g/cm$^3$;
viscosity of medium: 0.8007 mPa.s;
test temperature: 30° C.

The grain size graph produced by the Sedigraph apparatus is used to read the aluminium hydrate dispersibility corresponding to the percentage by weight of particles less than 0.3 μm in size. The higher this percentage, the better the dispersibility.

The aluminium hydrate of the invention is normally in the form of a powder. Further, the aluminium hydrate of the invention also has desirable pore distribution properties for certain oil refining applications. The pore diameters of the aluminium hydrate are in the range 50 to 300 Å, preferably in the range 80 to 250 Å, more preferably in the range 80 to 150 Å. Further, the crystallite size of the aluminium hydrate of the invention is less than 50 Å. Finally, the specific surface area of the aluminium hydrate of the invention is more than 280 m$^2$/g, preferably in the range 300 to 400 m$^2$/g and more preferably in the range 300 to 350 m$^2$/g.

The invention also concerns processes for preparing such an aluminium hydrate. In one implementation, the aluminium hydrate is prepared without back-mixing, using the following steps:
1. mixing a source of an aluminium acid and base or a basic source of aluminium and an acid, to precipitate aluminium monohydrate;

2. maturing;
3. filtering;
4. washing; and
5. drying.

This process uses the usual steps for preparing an aluminium hydrate by acido-basic precipitation, namely precipitation of the hydrate from acid and/or basic aluminium salts, then maturing, filtering, washing and drying the hydrate obtained. This process is characterized in that step 1 is carried out without back-mixing.

In step 1, the aluminium acid source can, for example, be selected from at least one of the following compounds: aluminium chloride, aluminium sulphate and aluminium nitrate. The basic aluminium source can be selected from basic aluminium salts such as sodium aluminate or potassium aluminate.

Depending on the acidic or basic nature of the starting aluminium-based compound, the aluminium hydrate is precipitated using a base or an acid selected, for example, from: hydrochloric acid, sulphuric acid, sodium hydroxide or a basic or acidic aluminium compound as cited above. The two reactants can, for example, be aluminium sulphate and sodium aluminate.

The reactants are normally used in the form of aqueous solutions.

The aluminium hydrate is precipitated by controlled pH. The pH is selected so as to precipitate aluminium monohydrate; in general, this pH is in the range 6 to 10 for a temperature of 60° C., preferably in the range 8 to 10. It is normally controlled by the choice of flow rates and concentrations of the reactants introduced into the reactor.

During precipitation, a suspension of aluminium hydrate is formed.

The essential characteristic of the present process is the nature of the reactor used in step 1. In this implementation of the invention, the reactants of step 1 must be mixed so that the back-mixing phenomenon is minimised and preferably completely avoided. The term "back-mixing" means the phenomenon by which the product from the reaction, i.e., aluminium hydrate, comes into contact with the starting reactants which continue to be introduced into the reactor and with the hydrate which has previously formed in the reactor. Thus the reactor employed must, for example, be such that the reaction product is remote from the location where the starting reactants are introduced.

Such mixing can be carried out on a plug flow reactor and in particular in a static mixer. "Lightnin" mixers can be cited in this regard.

Steps 2 to 5 are similar to those in current use in synthesising aluminium hydrate.

In step 2, the aluminium hydrate obtained, in dispersion in water, is matured. It can simply be stored in a reservoir, and it can also be heated or pressurised in an autoclave.

In step 3, the matured aluminium hydrate suspension is filtered.

In step 4, the filtered aluminium hydrate agglomerate is washed with water to eliminate undesirable impurities.

In step 5, the washed aluminium hydrate is dried: an aluminium hydrate powder is obtained. Drying is carried out at a temperature which avoids eliminating bound water.

In a further implementation, the aluminium hydrate is prepared with back-mixing, using the following steps:

1'. mixing aluminium sulphate and a base at a pH in the range 6 to 8.5 in a stirred reactor with back-mixing, at a temperature in the range 50° C. to 95° C.;

2'. maturing at a pH in the range 9 to 11 and at a temperature in the range 60° C. to 90° C.;

3'. filtering;
4'. washing; and
5'. drying.

In precipitation step 1', it is essential to use aluminium sulphate as the aluminium source. Selecting this starting compound produces the desired properties for the aluminium hydrate prepared in the reactor with back-mixing.

The basic source can be sodium hydroxide; it can also be a basic aluminium compound. Preferably, in this implementation with back-mixing, sodium hydroxide or sodium aluminate is used.

The reactants are normally used in the form of aqueous solutions.

The desired aluminium hydrate precipitation is partially obtained by controlling the pH, and thus the pH must be in the range 6 to 8.5. Preferably, it is in the range 6.5 to 8.5, more preferably in the range 6.5 to 7. It is normally controlled by the choice of flow rates and concentrations of the reactants introduced into the reactor.

The desired precipitation of the aluminium hydrate is also obtained in part by controlling the temperature which must be in the range 50° C. to 95° C., preferably in the range 50° C. to 70° C.

During precipitation, a suspension of aluminium hydrate is formed.

During precipitation, the reactor is agitated with back-mixing. This means that the product from the reactor, i.e., aluminium hydrate, comes into contact with the starting reactants which continue to be introduced into the reactor and with the hydrate which has already been formed in the reactor. To this end, any type of reactor provided with an agitating spindle, such as marine screws, inclined blades or Rushton turbines can be used.

In step 2', the aluminium hydrate obtained, in dispersion in water, is matured. This step 2' is a key point in producing the desired aluminium hydrate with back-mixing. This maturing step consists of storing the suspension from step 1' in a reservoir at a pH in the range 9 to 11 and at a temperature in the range 60° C. to 90° C. The maturing period is generally at least 10 minutes.

During maturing, the pH is controlled by adding a base; it may be sodium aluminate or sodium hydroxide. Preferably, it is sodium hydroxide.

Preferably, the dispersion is agitated during maturing.

Steps 3', 4' and 5' are carried out using conventional methods, for example using the methods described in steps 3, 4 and 5.

Finally, the invention concerns the use of aluminium hydrate as defined above or from the above processes for the preparation of catalysts or catalyst supports based on alumina.

This preparation is known to the skilled person and generally consists of forming the aluminium hydrate then calcining.

Forming can be carried out using any known method, such as mixing/extrusion, oil-drop formation, granulation, compacting or spraying.

The formed hydrate is then calcined at a temperature which can be in the range 300° C. to 1000° C., preferably in the range 500° C. to 800° C.

The main interest of the aluminium hydrate of the invention in preparing catalysts or catalyst supports is that its use enables the number of macropores in the catalyst or catalyst support to be controlled. The use of this hydrate can avoid the presence of meso- or macropores in the alumina of the catalyst or catalyst support. The term "macropores" means all pores with a diameter which is higher than the median diameter, preferably the median diameter plus 30 Å. The median diameter is defined from the pore distribution curve, obtained by measuring the porosity with mercury; it corresponds to the point of inflexion of the curve (i.e., the diameter at which the derivative of the volume curve=f (diameter) passes through a maximum).

The following examples illustrate the invention without in any way limiting its scope.

EXAMPLES

Example 1

In Accordance with the Invention

Step 1: Precipitation

A static Lightnin mixer with diameter DN25 was used. The following reactants were introduced at the concentrations and flow rates indicated below:

| aluminium sulphate | 22.75 g/l | 500 l/h |
| sodium aluminate | 290 g/l | 86 l/h |

The temperature was maintained at 60° C.

At the outlet from the static mixer, the pH was 9 and the concentration of aluminium hydrate was 60 g/l.

Step 2: Maturing

The hydrate obtained was introduced into a stirred reactor where the stirring means was a screw, the stirring power being 500 W/m$^3$. The reactor volume was 120 liters.

Batches of 290 g/l sodium aluminate were re-introduced to maintain the pH at 9. The maturing temperature was 90° C. The period was 3 hours.

Steps 3, 4 and 5

The hydrate was then filtered and washed with water. The quantity of washing water was of the order of 3040 l/kg of aluminium hydrate.

The hydrate was then spray dried. The outlet temperature was 115° C.

Results

The hydrate obtained had the following characteristics:

major crystalline nature: boehmite;

amount of boehmite: 75% by weight;

crystallite size: 45 Å;

loss on ignition at 1000° C: 23% by weight;

pore volume: 0.75 cm$^3$/g pore diameter: 91 Å;

specific surface area: 325 m$^2$/g.

The dispersibility of the hydrate was measured using a Sedigraph 5000 ET using the protocol defined below. More precisely, 46.4 g of aluminium hydrate was mixed for 30 minutes with a solution containing 3.15 g of nitric acid and 38.64 g of deionised water. The paste obtained had a loss on ignition of 59.5% by weight at 1000° C. This paste was diluted to 100 g/l with deionised water and the dispersion obtained was homogenised with moderate power ultrasound (2 minutes with a 5 mm probe, power 100 watts). Finally, the dispersion was analysed using a Sedigraph under the sedimentation conditions described above.

The grain size analysis is shown in FIG. 1. It can be seen that the percentage by weight of particles with a size of less than 0.3 μm, determined using the Sedigraph, was 92%. This aluminium hydrate was highly dispersible.

Comparative Example 2

Step 1: Precipitation

A stirred reactor was used in which the stirring means was a screw, the stirring power being 500 W/m$^3$. The reactor volume was 12 liters; it functioned continuously using a constant level regulator.

The following reactants were introduced at the concentrations and flow rates indicated below:

| aluminium sulphate | 22.75 g/l | 52.75 l/h |
| sodium aluminate | 290 g/l | 8.75 l/h |

The temperature was maintained at 60° C.

The pH was kept at 9 by controlling the reactant flow rates, and the final concentration of aluminium hydrate was of the order of 60 g/l.

Step 2: Maturing

This step was identical to that of Example 1.

Steps 3, 4 and 5

The hydrate was then filtered, washed and dried as in Example 1.

Results

The hydrate obtained had the following characteristics:

major crystalline nature: boehmite;

amount of boehmite: 75% by weight;

crystallite size: 45 Å;

total pore volume: 0.65 cm$^3$/g;

pore diameter: 80 Å;

specific surface area: 310 m$^2$/g.

The dispersibility of the hydrate was measured using a Sedigraph 5000 ET employing the protocol defined in Example 1.

Grain size analysis is shown in FIG. 1. It can be seen that the percentage by weight of particles with a size of less than 0.3 μm, determined using the Sedigraph, was 71%.

FIG. 1: [Translations for Figure]

| Poids cumule en % | cumulative weight, % |
| Hydrate selon exemple 1 | hydrate of Example 1 |
| Hydrate selon exemple 2 (comp) | hydrate of Example 2 (comp) |
| Diametre de sphere equivalent (μm) | diameter of equivalent sphere (μm) |

Comparative Example 3

Step 1': Precipitation

The following were introduced into a 3 liter stirred reactor:

a solution of sodium aluminate containing 142 g/l of Al$_2$O$_3$ at a flow rate of 4.8 l/h;

a solution of aluminium sulphate containing 80 g/l of Al$_2$O$_3$ at a flow rate of close to 3.8 l/h; and water, at a flow rate of 8.8 l/h.

The temperature of the water was 60° C.

The flow rate of the aluminium sulphate was used to adjust the pH of the reactor to a value close to 9.

Step 2': Maturing

This step was identical to that of Example 1.

Steps 3', 4' and 5'

The hydrate was then filtered, washed and dried as in Example 1.

The dispersibility of the hydrate was measured using a Sedigraph 5000 ET employing the protocol defined in Example 1. It can be seen that the percentage by weight of particles with a size of less than 0.3 μm, determined using the Sedigraph, was 72%.

Comparative Example 4

Step 1': Precipitation

The following were introduced into a 3 liter stirred reactor:
- a solution of sodium aluminate containing 142 g/l of $Al_2O_3$ at a flow rate of 4.81 l/h;
- a solution of aluminium nitrate containing 80 g/l of $Al_2O_3$ at a flow rate of close to 3.8 l/h; and
- water, at a flow rate of 8.8 l/h.

The temperature of the water was 60° C.

The flow rate of the aluminium sulphate was used to adjust the pH of the reactor to a value close to 7.

Step 2': Maturing

This step was identical to that of Example 1.

Steps 3', 4' and 5'

The aluminium hydrate was then filtered, washed and dried as in Example 1.

Results

The crystallite size in the hydrate obtained was 402Å.

The dispersibility of the hydrate was measured using a Sedigraph 5000 ET employing the protocol defined in Example 1. It can be seen that the percentage by weight of particles with a size of less than 0.3 μm, determined using the Sedigraph, was 68%.

Example 5

In Accordance with the Invention

Step 1': Precipitation

The following were introduced into a 3 liter stirred reactor::
- a solution of sodium aluminate containing 142 g/l of $Al_2O_3$ at a flow rate of 4.5 l/h;
- a solution of aluminium sulphate containing 80 g/l of $Al_2O_3$ at a flow rate of close to 7 l/h; and
- water, at a flow rate of 8.8 l/h.

The temperature of the water was 60° C.

The flow rate of the aluminium sulphate was used to adjust the pH of the reactor to a value close to 7.

Step 2': Maturing

This step was identical to that of Example 1.

Steps 3', 4' and 5'

The hydrate was then filtered, washed and dried as in Example 1.

Results

The crystallite size in the hydrate obtained was 35 Å and the specific surface area was 321 m²/g.

The dispersibility of the hydrate was measured using a Sedigraph 5000 ET using the protocol defined in Example 1. It can be seen that the percentage by weight of particles with a size of less than 0.3 μm, determined by the Sedigraph, was 81%. This hydrate was highly dispersible.

Example 6

In Accordance with the Invention

Step 1': Precipitation

The following were introduced into a 3 liter stirred reactor::
- a solution of sodium aluminate containing 356 g/l of $Al_2O_3$ at a flow rate of 4.5 l/h;
- a solution of aluminium sulphate containing 110 g/l of $Al_2O_3$ at a flow rate of close to 7 l/h; and
- water, at a flow rate of 8.8 l/h.

The temperature of the water was 60° C.

The flow rate of the aluminium sulphate was used to adjust the pH of the reactor to a value close to 7.

Step 2': Maturing

This step was identical to that of Example 1.

Steps 3', 4' and 5'

The hydrate was then filtered, washed and dried as in Example 1.

Results

The crystallite size in the hydrate obtained was 32 Å and the specific surface area was 345 m²/g.

The dispersibility of the hydrate was measured using a Sedigraph 5000 ET using the protocol defined in Example 1. It can be seen that the percentage by weight of particles with a size of less than 0.3 μm, determined by the Sedigraph, was 82%. This hydrate was highly dispersible.

What is claimed is:

1. An aluminum hydrate, having a dispersibility of at least 80% by weight for a diameter of 0.3 μm or less, and a crystallite size of less than 50 Å.

2. An aluminum hydrate according to claim 1, having a dispersibility of at least 90% by weight for a diameter of 0.3 μm or less.

3. An aluminium hydrate according to claim 2, having a pore diameter of 50 Å to 300 Å.

4. An aluminum hydrate according to claim 3, having a specific surface area of more than 280 m²/g.

5. An aluminum hydrate according to claim 4, comprising mostly aluminum monohydrate.

6. An aluminum hydrate according to claim 1, comprising mostly aluminum monohydrate.

7. An aluminum hydrate according to claim 1, having a pore diameter of 50 Å to 300 Å.

8. An aluminum hydrate according to claim 1, having a specific surface area of more than 280 m²/g.

9. A process for preparing an aluminum hydrate according to claim 1, comprising conducting the following steps:
   1. mixing a source of an aluminum acid and a base or a basic source of aluminum and an acid, to precipitate an alumina monohydrate;
   2. maturing;
   3. filtering;
   4. washing; and
   5. drying;
   wherein the mixing step 1 is carried out without back-mixing.

10. A process according to claim 9, wherein the mixing of step 1 is carried out in a plug flow reactor.

11. A process according to claim 9, wherein the mixing of step 1 is carried out in a static mixer.

12. A process according to claim 9, wherein the source of aluminum acid and base or basic source of aluminum and acid are continuously introduced into a reactor where mixing occurs throughout the reaction.

13. A process for preparing an aluminum hydrate according to claim 1, comprising the following steps:
   1. mixing aluminum sulphate and a base at a pH in the range 6 to 8.5 in a stirred reactor with back-mixing, at a temperature in the range 50° C. to 95° C.;
   2. maturing at a pH in the range 9 to 11 and at a temperature in the range 60° C. to 90° C.;
   3. filtering;

4. washing; and 5. drying.

14. A process according to claim 13, wherein a basic aluminum source is selected from sodium aluminate or potassium aluminate.

15. A process according to claim 13, wherein during step 1, the pH is 6.5 to 8.5.

16. A process according to claim 13, wherein during step 1, the pH is 6.5 to 7.

17. A process according to claim 13, wherein during step 1, the temperature is 50° C. to 70°C.

18. A process according to claim 13, wherein aluminum sulfate and base are continuously introduced into the reactor throughout the reaction.

19. In a process for the preparation of alumina-based catalysts or catalyst supports, the step of incorporating an aluminum hydrate according to claim 1.

20. A process according to claim 19, comprising controlling the amount of macropores in the alumina of catalysts or catalyst supports.

21. An aluminum hydrate according to claim 1, wherein the dispersibility is at least 90% by weight.

22. An aluminum hydrate according to claim 1, having a pore diameter of 80 Å to 250 Å.

23. An aluminum hydrate according to claim 1, having a pore diameter of 80 Å to 150 Å.

24. An aluminum hydrate according to claim 1, having a specific surface area of 300 to 400 $m^2/g$.

25. An aluminum hydrate according to claim 1, having a specific surface area of 300 to 350 $m^2/g$.

* * * * *